United States Patent

Dharanipragada et al.

[11] Patent Number: 6,073,095
[45] Date of Patent: Jun. 6, 2000

[54] FAST VOCABULARY INDEPENDENT METHOD AND APPARATUS FOR SPOTTING WORDS IN SPEECH

[75] Inventors: Satyanarayana Dharanipragada, Ossining; Ellen Marie Eide, Mount Kisco; Salim Estephan Roukos, Scardsale, all of N.Y.

[73] Assignee: International Business Machines Corporation, Armonk, N.Y.

[21] Appl. No.: 08/950,621

[22] Filed: Oct. 15, 1997

[51] Int. Cl.$^7$ .................................................. G10L 7/08
[52] U.S. Cl. ................................... 704/242; 704/255
[58] Field of Search .................... 704/256, 242, 704/231, 236, 246, 250, 251, 257, 255, 270

[56] References Cited

U.S. PATENT DOCUMENTS

| | | | |
|---|---|---|---|
| 4,817,156 | 3/1989 | Bahl et al. | 395/2.65 |
| 5,023,911 | 6/1991 | Gerson | 395/2.62 |
| 5,073,939 | 12/1991 | Vensko et al. | 395/2.5 |
| 5,199,077 | 3/1993 | Wilcox et al. | 395/2.65 |
| 5,309,547 | 5/1994 | Niyada et al. | 395/2.47 |
| 5,345,536 | 9/1994 | Hoshimi et al. | 395/2.52 |
| 5,664,227 | 9/1997 | Mauldin et al. | 707/516 |
| 5,794,194 | 8/1998 | Takebayashi et al. | 704/251 |
| 5,819,223 | 10/1998 | Takagi | 704/256 |

FOREIGN PATENT DOCUMENTS 0533491  3/1993  European Pat. Off. .......... G10L 5/06

OTHER PUBLICATIONS

ICASSP–88. Fissore et al., "Very Large vacabulary isolated utterance recognition: a comparison betwwen one pass and two pass strategies" vol. 2928 pp. 203–206. Apr. 1998.
Spoken Language, 1996, ICSLP 96. Nitta et al., "Wordspotting based on inter–word and intra–word diphone models" pp. 1093–1096 vol. 2. Oct. 1996.

*Primary Examiner*—Richemond Dorvil
*Attorney, Agent, or Firm*—F. Chau & Associates, LLP

[57] ABSTRACT

A fast vocabulary independent method for spotting words in speech utilizes a preprocessing step and a coarse-to-detailed search strategy for spotting a word/phone sequence in speech. The preprocessing includes a Viterbi-beam phone level decoding using a tree-based phone language model. The coarse search matches phone-ngrams to identify regions of speech as putative word hits, and the detailed search performs an acoustic match at the putative hits with a model of the given word included in the vocabulary of the recognizer.

20 Claims, 4 Drawing Sheets

Filler or mumble model

FAST VOCABULARY INDEPENDENT METHOD AND APPARATUS FOR SPOTTING WORDS IN SPEECH

BACKGROUND OF THE INVENTION

1. Field of the Invention

The invention relates to speech recognition. More particularly, it relates to a method and apparatus for vocabulary independent wordspotting in speech.

2. Prior Art

In practical applications of wordspotting in speech recognition, such as, for example, audio-indexing, voice mail retrieval, spoken message retrieval and audio-browsing, it is necessary to have the ability to process large amounts of speech at speeds many times faster than real-time. The present wordspotting techniques are generally composed of three types:

1. A large vocabulary continuous speech recognizer which is used to produce N best transcriptions of the speech. From the N-best lists, the a posteriori probability of the word in question, is estimated. If this probability exceeds a user-defined threshold, the given word is deemed present. M Weintraub, *"LVCSR Log-Likelihood Ratio Scoring For Keyword Spotting", ICASSP* 1995, Vol 1, pp 297–300.
2. Building a detailed acoustic model for background speech, and using it in parallel with a detailed model for the given word to compute the a posteriori probability of the word. If this probability exceeds a user-defined threshold, the given word is deemed present. J. R. Rohlicek, W. Russel, S. Roukos, H. Gish. *"Word Spotting", ICASSP* 1989, pp 627–630.
3. Speech is pre-processed and stored as a phone lattice by running a modified Viterbi decoder on null-grammar phone network. The presence of a given word is determined by conducting a dynamic programming search on the phone lattice. D. A. James, S. J. Young. *"A Fast Lattice-Based Approach To Vocabulary Independent Wordspotting", ICASSP* 1994, pp 377–380.

All of the above methods have their shortcomings. In the first method, wordspotting essentially reduces to searching through text. Consequently, retrieval is fast. However, words that do not appear in the vocabulary of the speech recognizer cannot be spotted. The second method has no limitations on the words that can be searched for, but is very slow since it requires re-running the wordspotter every time a new word is specified. The third method has both the flexibility of being able to search for any word and speed of retrieval. However, it relies heavily on phone recognition accuracy which is often very poor.

SUMMARY OF THE INVENTION

The method according to an illustrative embodiment proposes a three-step procedure. A preprocessing step and a two-stage search strategy. In the preprocessing step, the speech waveform is converted into a representation consisting of a table of phone-ngrams with the times at which the phone-ngrams occur with a high likelihood. This representation allows searching through the speech very efficiently. The subsequent two stage search consists of a first coarse match step where a phone-ngram lookup is implemented to narrow down the time intervals where the word was likely to have been uttered, and then a detailed acoustic match at these time intervals to finally decide more accurately whether the word was actually uttered in that time interval.

The proposed method for wordspotting has both speed of retrieval and the flexibility of being able to search for any word. In order to obtain an increased speed of retrieval, the regions of speech where the word could have been uttered are narrowed down through the coarse match. By imposing a strong language model in the Viterbi phone decoder in a preprocessing state, and by running the detailed acoustic match with context dependent acoustic models at the regions of speech determined by the coarse match, a higher degree of accuracy is obtained.

The method according to an illustrative embodiment of the invention can be used in applications such as voice mail retrieval, and browsing and searching audio/video content. In these applications, the user types a search query, and a first determination is made as to the words that are out of the vocabulary of the speech recognizer used in transcribing the speech content. For each of these words, the phonetic baseforms are determined using either a large dictionary of baseforms or a spelling to baseform generator. The method of the invention is then employed to determine the locations of these words in the audio/video database. These locations and the number of occurrences are then used in the scoring functions of a search engine (e.g., information retrieval algorithm) to retrieve the segments of audio/video that are relevant to the query.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4b is a diagram illustrating a network used in the detailed acoustic match stage of the present method, which incorporates the filler model of FIG. 4a.

DETAILED DESCRIPTION OF PREFERRED EMBODIMENTS

Figure 1:
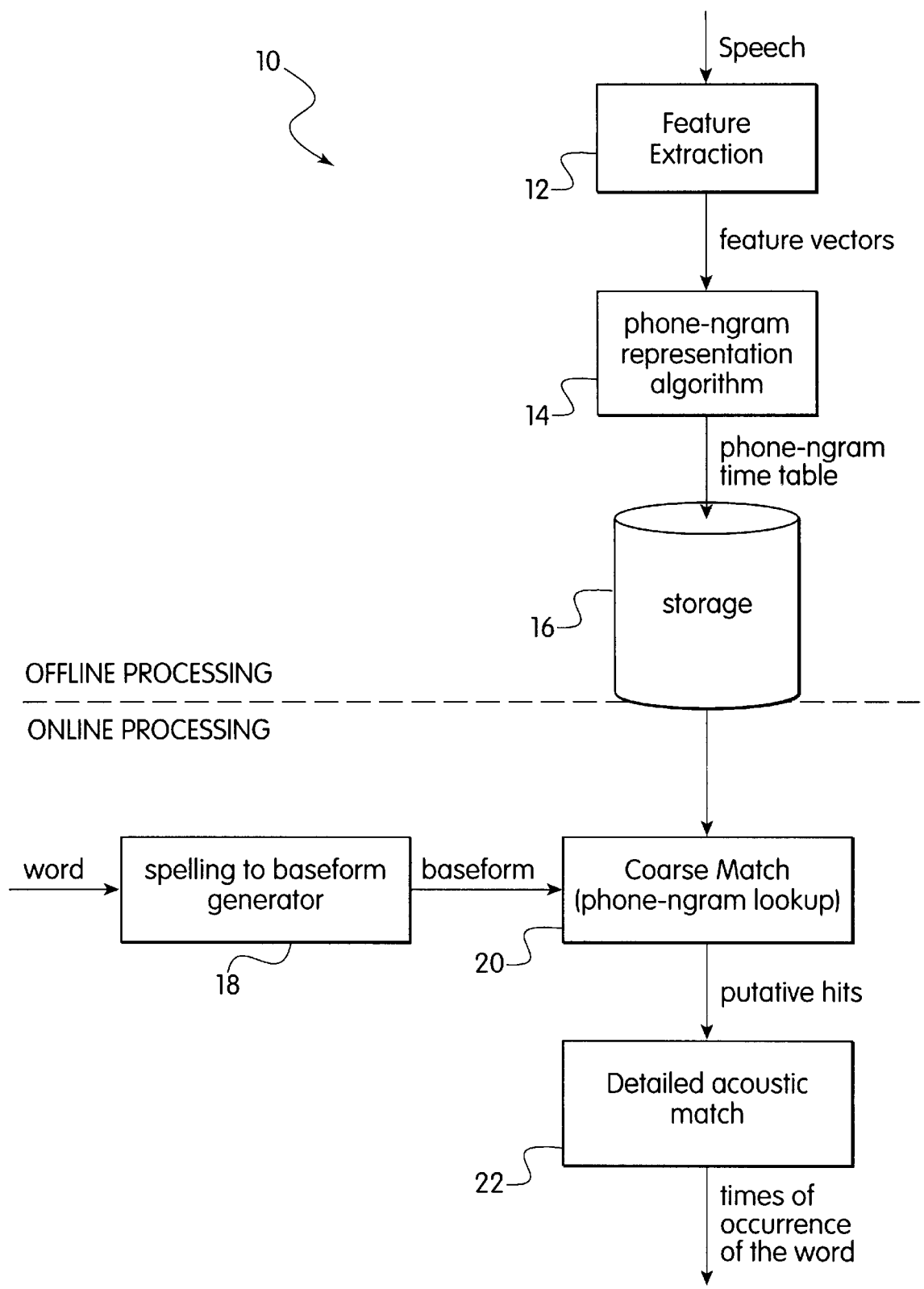
FIG. 1 is a high level block diagram of the wordspotting apparatus according to an illustrative embodiment of the invention.

Referring to FIG. 1, the wordspotting apparatus 10 of the invention is shown. The apparatus includes an offline preprocessing stage that consists of converting the speech waveform into a table consisting of times of occurrence of phone-ngrams (usually triphones) in the given speech. The phone-ngram time-table is obtained by performing a feature extraction 12 to the input speech waveform to produce feature vectors $f_t$, which are then processed by a phone n-gram representation algorithm 14. The algorithm performs a time-synchronous Viterbi-beam search which uses a phone language model organized as a tree to constrain the dynamic programming search. Algorithm 14 produces the phone-ngram time table which is stored in a storage device 16. Storage device 16 can be any suitably known storage device, such as, for example, a random access memory, a magnetic disk or tape, an optical disk, etc.

The online processing stage performs a coarse match 20 of the phone-ngram time table previously stored. The coarse match is a phone-ngram lookup step, and receives a baseform from a spelling to baseform generator 18. The putative hits determined in the coarse match step are then processed in a detailed acoustic match step 22. The detailed acoustic match will provide the different times of occurrence of an identified word.

Figure 2:
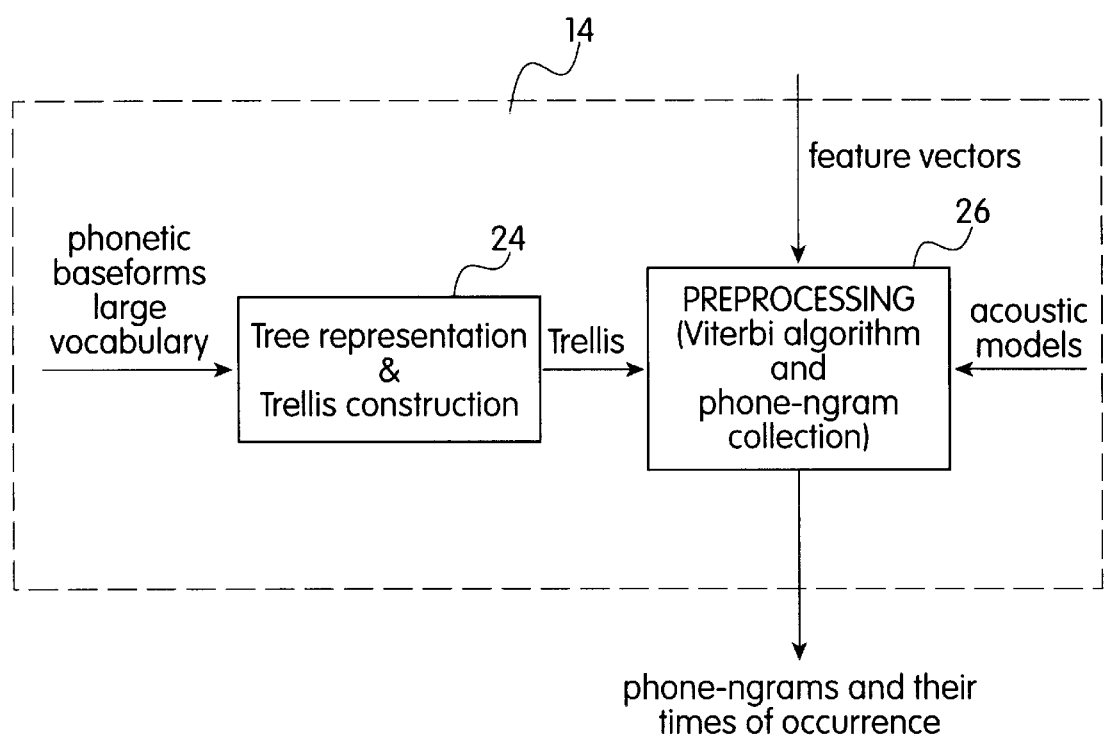
FIG. 2 is a block diagram schematically representing the preprocessing stage.
Figure 3:
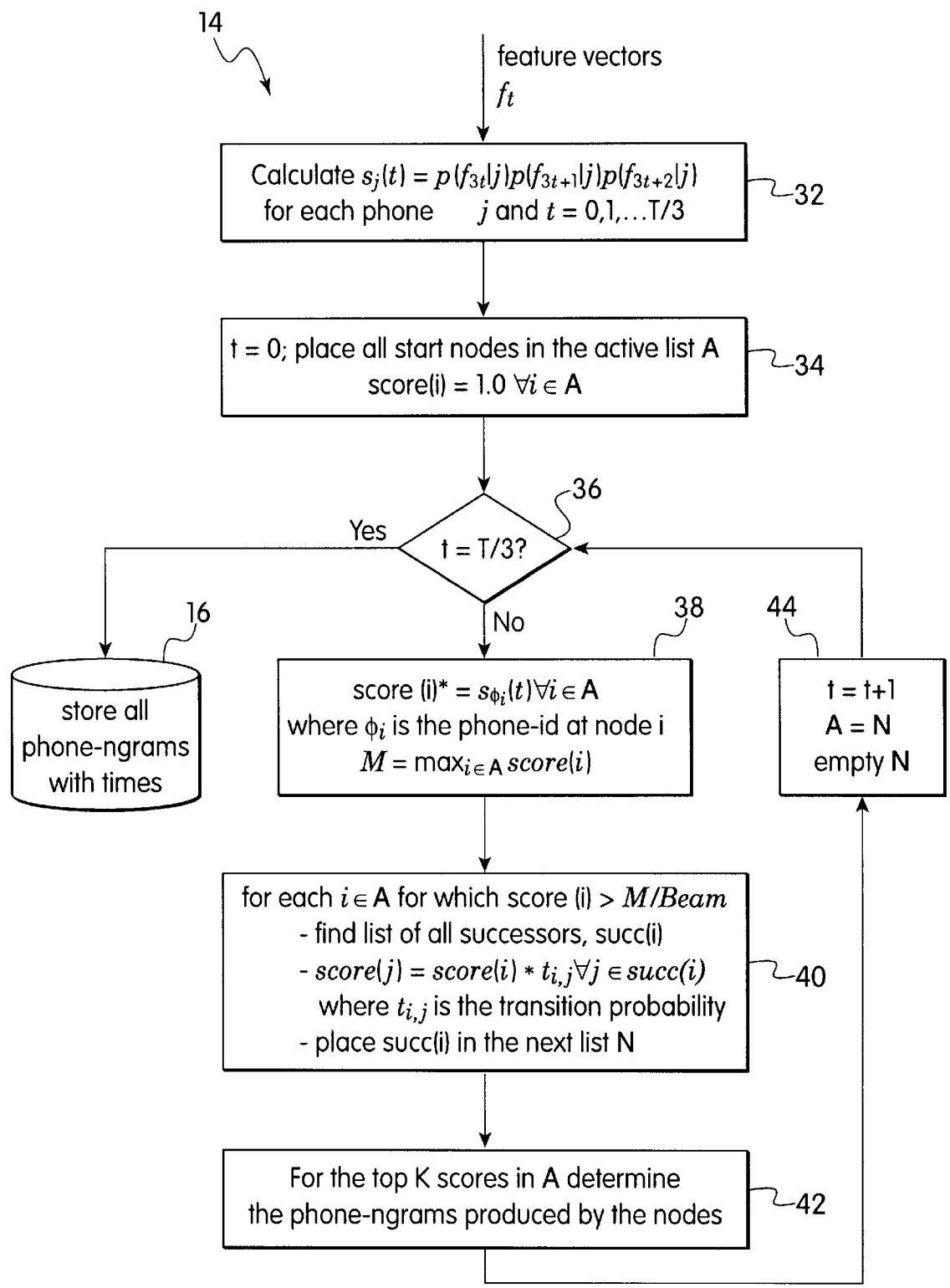
FIG. 3 is a flow chart diagram of the preprocessing method according to an illustrative embodiment of the invention.

Referring to FIGS. 2 and 3, the phone-ngram algorithm 14 arranges the phonetic baseforms of the words in a large vocabulary speech recognizer in the form of a tree 24 (i.e., the fast match tree). The tree representation is then converted into a graph capable of representing arbitrary sequences of words by adding arcs which go from each leaf back to the root node. Transition probabilities are assigned to each arc as 1/N where N is the number of arcs leaving the source node. A self-loop probability of 0.5 is also assumed for each node. This graph is used to constrain a dynamic programming search. This conversion is known in the art as trellis construction and can be found in U.S. patent application Ser. No. 08/798,011 filed on Feb. 12, 1997, now U.S. Pat. No. 5,884,259, which is incorporated herein by reference.

Phones attached to each arc of the fast match tree are represented by a context independent single state Hidden Markov Model (HMM) to reduce computation. In order to maintain the desired three-frame minimum duration, transitions only every third frame are allowed. When a single state topology is used, each node of the fast match tree directly corresponds to a state in the trellis. The trellis is then input into the preprocessing stage 26.

FIG. 3 shows the processing performed in the phone n-gram representation algorithm 14. The $s_j(t)$ is calculated for each phone j (step 32) from the feature vectors $f_t$. Where $$s_j(t)=p(f_{3t}|j)p(f_{3t+1}|j)p(f_{3t+2}|j) \qquad (1)$$

and t=0, 1 . . . T/3. The probabilities $p(f_k|k)$ are computed as the maximum probability of all leaves of the phone, thus providing context-independence. At t=0, all start nodes are placed in the active list A where score (i)=1.0 $\forall$i $\in$ A (step 34). A modified Viterbi search is used to find the best path through the trellis, where nodes in time correspond to every third frame of utterance. (See, G. D. Forney, Jr. "*The Viterbi Algorithm,*" *Proc. IEEE,* vol 61, pp 268–278. 1973). Thus, at step 36 a determination is made as to whether t=T/3. If it does, the phone-ngram is stored in the storage device 16. If t≠T/3, the following steps 38–44 are performed.

At every third frame, the scores of all the active nodes are updated and the maximum score, M, is computed (step 38). Thus, at step 38, the following determinations are made: score (i) *=$s_{\phi i}(t)$ $\forall$ i $\in$ A, where $\phi_i$ is the phone-id at node i, and M=$\max_{i \in A}$ score(i). In step 40, for each i $\in$ A for which score (i)>M/Beam, a list of all successor nodes succ(i) is determined. Here M is determined in step 38 and Beam is a user defined parameter. Next for each j $\in$ succ(i), score (j) is updated as score (j)=score (i) * $t_{i,j}$, where $t_{i,j}$ is the transition probability between node i to node j. All the successors succ(i) are placed in the next list N. At step 42, the phone ngrams produced by the top K nodes in A are determined.

Once step 42 is complete, t is incremented by one, i.e., t=t+1, A=N, and the N list is emptied. At this point, the determination as to whether t=T/3 is performed again at step 36. The entire process is repeated until there are no more phone ngrams produced by the nodes.

Each node in the trellis represents a sub-word or a phone sequence which is to be determined by traversing the tree from the root node to that node. The sub-word or phone sequence can also be described by the triphones it generates. The active nodes thus signify the top triphones that best describe that local region of speech. These triphones are then stored. To reduce storage, the time axis is discretized into T second intervals, where T is a user defined parameter, and all active triphones are binned into these intervals. Thus, a table of triphones versus their times of occurrence in the given speech, is generated, e.g. if the time axis is binned in 1 second intervals and if triphones N EH DX appeared in the top K nodes in the time interval [21,22] and [31,32], EH DX AX appeared in the top K nodes in the time interval [21,22] and [51,52] etc, then the table appears as:

| triphone | time | (secs) |
|---|---|---|
| N EH DX | 21 | 31 |
| EH DX AX | 21 | 51 |
| DX AX N | 31 | 40 |

Coarse Search for Putative Hits

The first step of the online processing is the coarse match step 20 (FIG. 1). Given a keyword, its phonetic-transcription (baseform) is determined using either a large dictionary of baseforms or a spelling to baseform generation mechanism 18. From the baseform, all the triphones the baseform generates can be determined. Let $N_b$ be the number of these triphones. For example, if the phonetic baseform for the word "Netanyahu" is N EH DX AX N Y AA HU W then $N_b$=7, where the 7 triphones are N EH DX, EH DX AX, DX AX N, AX N Y, N Y AA, Y AA HU, AA HU W. For each of these triphones we look-up, from the phone-ngram table generated in the preprocessing step, the time where the triphone was found in the speech. When more than a certain user-defined fraction, r, of the total number of triphones are found in a given time interval, that time-interval is classified as a putative hit. The fraction r controls the number of false-alarms and detection rate. By reducing r the number of false alarms as well as the detection rate increases. When r is increased the number of false alarms and detection rate is reduced. Thus, by varying r we get a Receiver operating characteristic (ROC) curve for the wordspotter at the coarse search stage.

Detailed Match at the Putative Hits

Figure 4A:
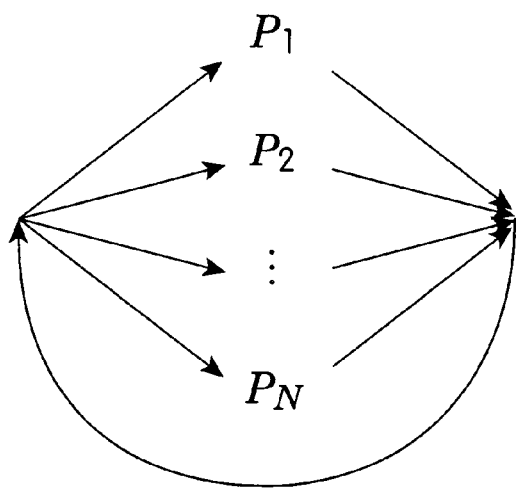
FIG. 4a is a representation of the filler model and network used in the detailed acoustic match stage of the presented method.

In order to reduce the number of false alarms a more detailed acoustic match 22 can be performed at the regions classified as putative-hits in the previous coarse match stage. During this step, a detailed model using a 'right and left within word context' is built for the given word. With this model of the word included in the vocabulary, a modified Viterbi-search or an A* search is conducted at the putative hits. In the modified Viterbi search scheme, all words other than the given word represent the background speech or filler model (illustrated in FIG. 4a). The a posteriori probability of the end state of the given word is then computed. If this probability exceeds a user-defined threshold, it is classified as a hit. Once again, this threshold controls the number of false alarms and the detection rate.

Figure 4B:
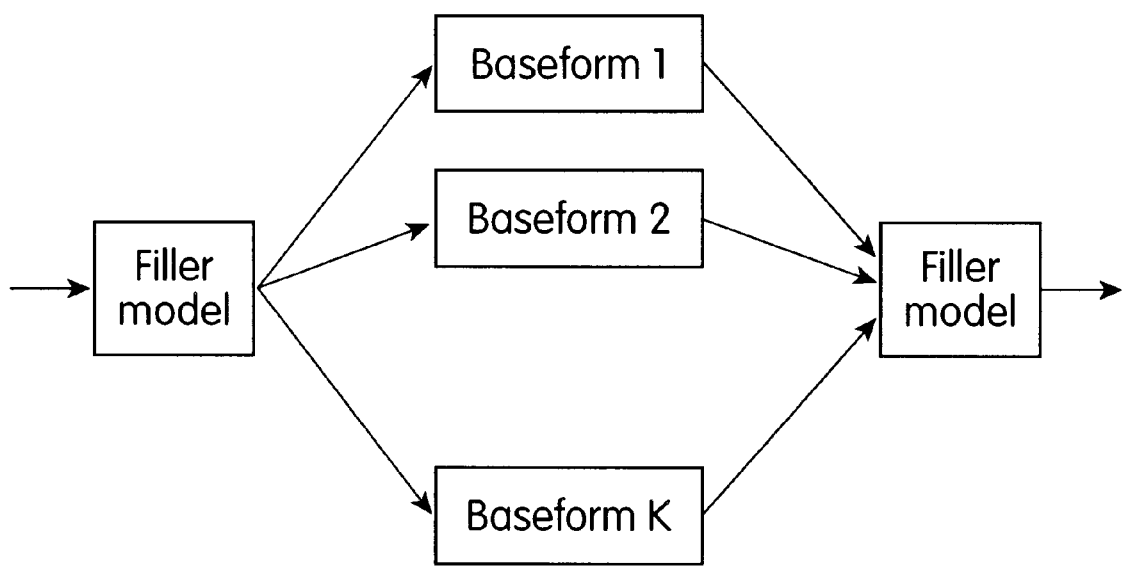

In order to speed up the detailed acoustic match 22, a simpler two step approach is employed. First a network consisting of "mumble" or "filler" models and all the alternative baseforms is constructed as shown in FIG. 4b. For each putative hit, the best path through this network is computed using a Viterbi algorithm with traceback and the start and end times, $t_s$, $t_e$, for the word are determined. Next, the filler model and each of the alternative baseforms are scored between the start and end-time determined in the previous step, and the duration normalized log-likelihood ratio (DNLLR) is computed as follows:

$$DNLLR = \frac{logScore(S_e, t_e) - logScore(S_0, t_s)}{t_e - t_s},$$

where logScore(s,t) is the viterbi score of state s at time t and $S_0$, $S_e$ are start and exit states respectively of the word HMM. All putative hits are ranked on the best DNLLR and the top N putative hits are classified as hits.

All steps described in the illustrative embodiments of the invention can be performed on a general purpose computer being programmed accordingly.

The presented embodiment has been described with respect to a single state context independent HMM to model a phone in the preprocessing stage. However, since computational expense is not a primary issue for preprocessing, a more detailed three-state context dependent HMM for a phone can be used. This would improve phone recognition accuracy at the expense of more computation and would also reduce the number of false alarms in the coarse match stage.

As an alternative to the two stage search for the word, the speech can be pre-processed in the same way as before but the results can be scored as a phone lattice. For retrieval, a dynamic programming match of the given word against the lattice is performed.

It should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. A fast vocabulary independent method for spotting words in speech comprising the steps of:
   converting a speech waveform into a representation comprising phone-ngrams and a corresponding time interval of occurrence of each of the phone-ngrams;
   receiving phone-ngrams of at least one input word;
   performing a coarse match by selecting time intervals of the speech waveform having phone-ngrams that correspond to the phone-ngrams of the at least one input word; and
   performing a detailed acoustic match at the selected time intervals.

2. The method according to claim 1, wherein said step of converting the speech waveform comprises the steps of:
   generating feature vectors representative of the speech waveform;
   processing the feature vectors to generate the phone-ngrams for each word in the speech waveform; and
   storing the phone-ngrams and their corresponding time intervals in a look-up table.

3. The method according to claim 2, wherein said step of processing the feature vectors comprises the steps of:
   constructing a phone language model from a phonetic baseforms vocabulary; and
   performing a time synchronous Viterbi-Beam search using the phone language model for converting the speech waveform into phone-ngrams.

4. The method according to claim 3, wherein said step of performing a time synchronous Viterbi-Beam search further comprises the steps of:
   computing the maximum probability of all leaves of a phone;
   placing all start nodes in an active list "A";
   determining the best path through the constructed phone language model;
   updating the scores of all active nodes at every third frame;
   computing the maximum score "M";
   determining a list of all successor nodes;
   placing the successor nodes in a next list "N"; and
   determining the phone-ngrams produced by the nodes for the top K scores in A.

5. The method according to claim 1, wherein a given time interval of the speech waveform is selected during the step of performing the coarse match if a predetermined fraction of the total number of phone-ngrams of the input word are determined to be within the given time interval.

6. The method according to claim 1, wherein said step of performing a detailed acoustic match comprises the steps of:
   building a model of a given word associated with at least one of the selected time intervals;
   conducting a modified Viterbi search at the at least one selected time interval associated with the given word;
   computing an a posteriori probability of the end state of the given word; and
   outputting the at least one selected time interval if the a posteriori probability of the given word exceeds a predetermined threshold.

7. The method according to claim 1, wherein said step of converting the speech waveform is performed offline as a preprocessing step, and said steps of performing the coarse match and the detailed acoustic match are performed online during processing.

8. The method according to claim 1, wherein the phone-ngrams of the speech waveform and the phone-ngrams of the at least one input word are triphones.

9. The method according to claim 1, wherein said step of receiving phone-ngrams of at least one input word comprises the steps of:
   determining a phonetic baseform of the at least one input word; and
   identifying all phone-ngrams of the phonetic baseform.

10. The method according to claim 9, wherein said step of determining the phonetic baseform is performed using one of a group consisting of a large dictionary of baseforms and a spelling to baseform generator.

11. A fast vocabulary independent method for spotting words in speech comprising the steps of:
    converting a speech waveform into a table comprising phone-ngrams and the corresponding times of occurrence in the speech waveform of the phone-ngrams;
    generating phone-ngrams of at least one input word;
    performing a coarse match by implementing the table to identify time intervals of the input waveform having phone-ngrams associated therewith that correspond to the phone-ngrams of the at least one input word; and
    performing a detailed acoustic match at each of the identified time intervals of the speech waveform to finally decide whether the at least one input word was actually uttered in the identified time intervals.

12. The method according to claim 11, wherein the phone-ngrams of the speech waveform and the phone-ngrams of the at least one input word are triphones.

13. The method according to claim 11, wherein a time interval of the speech waveform is identified during the step of performing the coarse match search if a user-defined fraction of a total number of phone-ngrams of the at least one input word are determined to be within the time interval.

14. A fast vocabulary independent method for spotting words in speech for use in voice mail retrieval systems and browsing and searching audio/video content, the method comprising the steps of:

receiving a search query from a user;

determining a phonetic baseform for each word of the search query and converting each baseform to phone-ngrams;

identifying the locations of the search query words in an audio/video database by comparing phone-ngrams of the search query words and phone-ngrams of at least one audio waveform in the audio/video database; and retrieving segments of the at least one audio waveform and corresponding video segments that are relevant to the received query.

15. The method according to claim 14, wherein said step of determining the phonetic baseforms is performed using one of a group consisting of a large dictionary of baseforms and a spelling to baseform generator.

16. The method according to claim 14, wherein said step of identifying the locations further comprises the steps of:

converting the at least one audio waveform into a table of phone-ngrams;

performing a coarse match by implementing the table to identify time intervals of the at least one audio waveform having phone-ngrams associated therewith that correspond to the phone-ngrams of the query words; and performing a detailed acoustic match at each of the identified time intervals of the at least one audio waveform to determine whether the search query words were actually uttered in the identified time intervals.

17. The method according to claim 16, wherein said step of converting further comprises the steps of:

generating feature vectors representative of the at least one audio waveform;

processing the feature vectors to generate the phone-ngrams for each word in the at least one audio waveform; and storing the phone-ngrams and their corresponding time intervals in a look-up table.

18. A program storage device readable by a machine, tangibly embodying a program of instructions executable by the machine to perform a fast vocabulary independent method for spotting words in speech, the method steps comprising:

converting a speech waveform into a table comprising phone-ngrams and the corresponding times of occurrence in the speech waveform of the phone-ngrams;

generating phone-ngrams of at least one input word;

performing a coarse match by implementing the table to identify time intervals of the speech waveform having phone-ngrams associated therewith that correspond to the phone-ngrams of the at least one input word; and performing a detailed acoustic match at each of the identified time intervals of the speech waveform to finally decide whether the at least one input word was actually uttered in the identified time intervals.

19. The program storage device of claim 18, wherein the phone-ngrams of the speech waveform and the phone-ngrams of the at least one input word are triphones.

20. The program storage device of claim 18, wherein a time interval of the speech waveform is identified during the step of performing the coarse match search if a user-defined fraction of a total number of phone-ngrams of the at least one input word are determined to be within the time interval.

* * * * *